Dec. 4, 1962  M. T. MONTELEONE  3,067,041
METHOD OF PACKAGING HAM
Filed Dec. 1, 1959
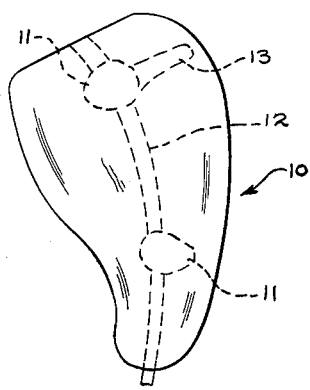
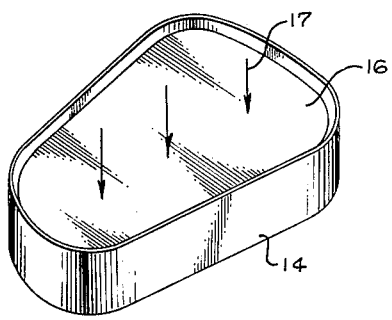
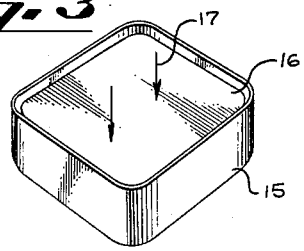
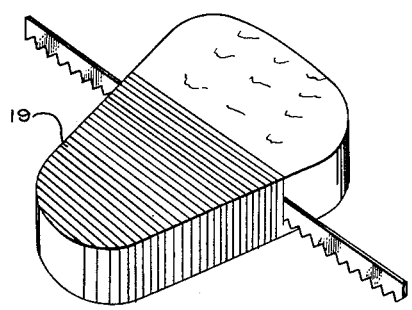
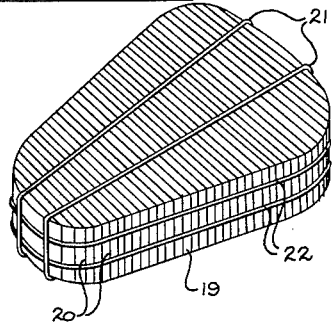
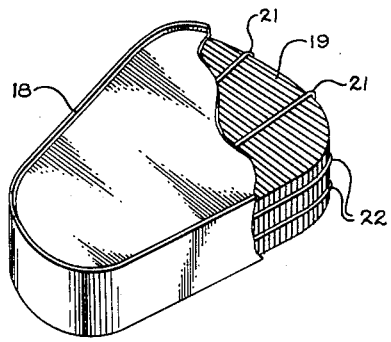
MIKE T. MONTELEONE
INVENTOR.
BY
ATTORNEYS United States Patent Office 3,067,041
Patented Dec. 4, 1962

3,067,041
METHOD OF PACKAGING HAM
Mike T. Monteleone, 4223 10th Ave., Los Angeles, Calif.
Filed Dec. 1, 1959, Ser. No. 856,514
3 Claims. (Cl. 99—187)

This invention relates generally to the processing of meat, and particularly ham, and more specifically concerns a novel method of processing ham to predetermined shape, and so as to be already sliced for serving when the same is taken from the can. The invention will be described with particular reference to the packaging of ham, but it will be understood that there are other forms and types of meat which can be processed to equal advantage by the present method.

In the meat retailing industry there is much demand for meats that are already sliced, particularly for ham slices, but at the present time I am aware of no method by which ham may be packaged in pre-sliced condition so as to be ready for serving when taken from the can. Accordingly, it is a major object of the present invention to prepare meat and particularly ham for the market in a new and superior form, and specifically to process the ham to predetermined shape so as to be already sliced for serving when taken from the can.

The invention broadly contemplates the processing of ham into slices while retaining the over all ham shape so as to be fitted closely within the can or receptacle. It is then possible upon opening of the can to serve the ham in already sliced condition, obviating the necessity for slicing canned ham. This desired object, however presents certain problems in the processing of ham since the prior art teaches that cooking of a canned ham is done after the ham is finally sealed in the can, this step reducing the size of the ham through loss of meat juices from the ham interior.

The present novel method broadly contemplates boning, curing and molding of the ham to predetermined shape conforming to the end-product to be canned, cooking the molded ham thereby reducing it to end-product size capable of fitting in the can, thereafter slicing the cooked ham and tying it to retain its as-molded and reduced shape, and finally canning of the tied ham. In the as-molded condition prior to cooking, the ham is slightly larger than the end-product to be fitted within the can, the excess representing the loss in size of the ham due to the cooking process. After being cooked, the ham is typically chilled for slicing purposes, after which the slices are bound together in compressed series stacked relation conforming to the as-molded and reduced shape of the ham capable of fitting within the canning receptacle.

Another important step of the invention having to do with preserving the juiciness and flavor of the end-product in the can comprises adding to the ham in the can prior to sealing the juices or portions thereof which were removed during the cooking step in the mold. These juices tend to become re-absorbed in the ham in the can during the storage interval, such absorption being favored by penetration of the juices between the tied together slices. These and other objects and advantages of the present invention, as well as the details of an illustrative embodiment, will be more fully understood from the following detailed description of the drawings, in which:

FIG. 1 is a diagrammatic view of a ham showing the leg bone and the aitch bone;

FIG. 2 shows a mold within which the boned ham is pressed and cooked;

FIG. 3 shows a Pullman shaped mold having a function the same as that of the mold shown in FIG. 2;

FIG. 4 shows the as-molded and chilled ham being sliced after removal from the mold;

FIG. 5 shows the sliced and molded ham in tied condition; and

FIG. 6 shows the tied ham in the can within which the ham is marketed.

The ham shown in FIG. 1 at 10 has joints 11, a leg bone 12 and an aitch bone 13, all of which are removed from the ham as by a boning step prior to further processing. Previous to or in conjunction with boning, the ham is trimmed by removing excess fat. The resultant boned and trimmed ham may then be pickle cured, as by insertion into the meat of a solution of brine and Prague powder, or by sweet curing as by inserting an aqueous sugar solution. The curing step may alternatively precede the boning, and also the ham may be smoked after curing and before canning according to conventional methods.

In accordance with the invention, the ham is then inserted in a mold 14 having for example a pear shape as shown in FIG. 2, or a Pullman shape as at 15 in FIG. 3. The loosely inserted ham is then forcibly conformed to the shape of the mold, as for example by pressing downwardly upon an insert 16 inserted into the mold cavity, the insert periphery fitting the mold cavity periphery and the insert being generally flat. Typically, a pressure of around 200 pounds may be exerted downwardly upon the insert, as indicated by the arrows 17, to accomplish the molding of the ham into desired shape.

Such desired shape is slightly larger than the size of the can 18, shown in FIG. 6, in which the ham is to be ultimately canned, the excess size representing the loss due to rendering of meat juices from the ham during cooking in the as-molded condition. Such cooking may be carried out in hot water for a length of time dependent upon the ham size, the criterion normally being the length of time to achieve a predetermined internal temperature within the molded ham of, say, around 150° F. Thus smaller hams will cook in less time than will be required for larger hams. The cooking is preferably carried out with the ham in the mold and with the insert 16 in position in the mold to retain meat juices therein. However, no mechanical pressure as indicated by the arrow 17 is exerted upon the insert, for such pressure would cause loss of meat juices from between the periphery of the insert and the inner wall of the mold.

When the cooked in the mold hams are removed from the cooking bath, the inserts 16 are removed and the meat juices are poured off and cooled for later use. The ham is then removed from the mold and subjected to sudden chilling to a temperature somewhat above freezing, say, between 36 and 38° F., such chilling sets up the juices remaining in the ham and makes it capable of ready slicing. Thereafter, as indicated in FIG. 4 the chilled ham is sliced to desired thickness, the parallel slices being shown at 19. After this step, the chilled and sliced ham is tied as by wrapping butcher's twine lengthwise around the sliced ham in directions generally perpendicular to the lines 20 indicating the divisions between the slices 19. Thus, two wraps 21 are taken around the top and bottom of the ham and two wraps 22 are taken around the sides and ends of the ham, the tying being sufficient to hold the slices in compressed and series stacked relation.

Next, the tied ham shown in FIG. 5 is placed in the can 18, which it fits due to loss of juices in the cooking step, and treating liquid is added to the can to fill it. Such treating liquid according to the invention preferably includes at least some of the juices that were removed from the ham by the cooking step, and the liquid may also include gelatin. Thereafter, the can is sealed by conventional methods and evacuated. It may then be refrigerated and stored under refrigeration to develop the flavor of the meat, the added juices then tending to reenter the ham particularly by way of the divisions between the ham slices. Prior to refrigeration, the temperature of the canned ham may be raised quickly and held for a short interval to kill the bacteria in the can.

To obviate cutting of the ham slices by the tying means, the latter may comprise flat tape or ribbon having width sufficient to prevent undesired cutting while still holding the slices in tightly bound together relation.

From the foregoing, it will be concluded that the ham is made much more marketable since it need only be removed from the can, oven cooked and then untied as by snipping off the wraps 21 and 22, the slices 19 then being already available for serving.

I claim:

1. The method of processing ham to predetermined shape and so as to be already sliced for serving when taken from the can, said method including boning, curing and molding the ham to predetermined shape conforming to the end product to be canned, cooking the molded ham, said cooking step acting to remove liquid from the ham, slicing the cooked ham, thereby to form parallel slices, and tying same to retain the slices in the as-molded and reduced ham shape, canning the tied ham along with gelatinous liquid for storage and raising the temperature of the canned ham for an interval sufficient to kill bacteria in the can without loosening the tied ham slices.

2. The method of processing ham to predetermined shape and so as to be already sliced for serving when taken from the can, said method including boning, curing and molding the ham to predetermined shape in a mold and slightly larger than the end product to be canned, cooking the molded ham thereby reducing same to end product size capable of fitting in the can, said cooking step acting to remove liquid from the meat, chilling the cooked ham, slicing the cooked and chilled ham, thereby to form parallel slices, and tying same to retain the slices in the as-molded and reduced ham shape, canning the tied ham along with gelatinous liquid for storage and raising the temperature of the canned ham for an interval sufficient to kill bacteria in the can without loosening the tied ham slices.

3. The method of processing meat to predetermined shape and so as to be already sliced when taken from the can, said method including boning and molding the meat to predetermined shape in a mold and slightly larger than the end product to be canned, cooking the molded meat thereby reducing same to end product size capable of fitting in the can, said cooking step acting to remove liquid from the meat, slicing the cooked meat thereby to form parallel slices and tying same to retain the slices in the as-molded and reduced meat shape, canning the tied meat along with gelatinous liquid for storage and raising the temperature of the canned meat for an interval sufficient to kill bacteria in the can without loosening the tied meat slices.

References Cited in the file of this patent

UNITED STATES PATENTS

| | | |
|---|---|---|
| 2,140,162 | McKee | Dec. 13, 1938 |
| 2,224,399 | Komarik | Dec. 10, 1940 |
| 2,419,424 | Staab | Apr. 22, 1947 |
| 2,696,442 | Allbright | Dec. 7, 1954 |